United States Patent [19]

Kawamura et al.

[11] 4,156,414
[45] May 29, 1979

[54] EXHAUST GAS PURIFYING DEVICE FOR INTERNAL COMBUSTION ENGINE WITH AUXILIARY COMBUSTION CHAMBER

[75] Inventors: Hideo Kawamura, Yamato; Hideo Ohta, Kanagawa; Kimi Kubota, Chigasaki, all of Japan

[73] Assignee: Isuzu Motors Limited, Kawasaki, Japan

[21] Appl. No.: 869,343

[22] Filed: Jan. 13, 1978

[30] Foreign Application Priority Data

Jan. 20, 1977 [JP] Japan .................................. 52/5209

[51] Int. Cl.² .......................................... F02M 25/06
[52] U.S. Cl. .............................................. 123/119 A
[58] Field of Search .................................. 123/119 A

[56] References Cited

U.S. PATENT DOCUMENTS

| | | | |
|---|---|---|---|
| 2,456,213 | 12/1948 | Pelc | 123/119 A |
| 2,701,556 | 2/1955 | Woerner | 123/119 A |
| 3,702,111 | 11/1972 | Weaving et al. | 123/119 A |
| 3,703,164 | 11/1972 | Weaving | 123/119 A |
| 3,785,355 | 1/1974 | Toepel | 123/119 A |
| 3,799,130 | 3/1974 | Dahlstrom | 123/119 A |
| 3,834,364 | 9/1974 | Bartholomew | 123/119 A |
| 3,982,514 | 9/1976 | Turns et al. | 123/119 A |
| 3,986,351 | 10/1976 | Woods et al. | 123/119 A |
| 4,011,845 | 3/1977 | Mayer et al. | 123/119 A |
| 4,060,059 | 11/1977 | Blaser | 123/119 A |

*Primary Examiner*—Wendell E. Burns
*Attorney, Agent, or Firm*—Sughrue, Rothwell, Mion, Zinn and Macpeak

[57] ABSTRACT

A recirculating and recombustion type of exhaust gas purification system for a compression ignition engine includes an expansion manifold communicating with auxiliary combustion chambers of each cylinder through separate passages. Cam operated valves are located in each of the separate passages. The exhaust gas in an auxiliary combustion chamber is expanded into the manifold through one of the cam operated valves and is then drawn into the auxiliary combustion chamber of another cylinder whose piston is near the bottom of its intake or suction stroke via another open cam operated valve. The thus recirculated or transferred exhaust gas is cooled by its expansion into the manifold, water jacketing within the cylinder head and air surrounding the exposed periphery. Further, in high load operation of the engine, a single butterfly valve disposed midway of the expansion manifold can control the amount of the exhaust gas circulation to improve the engine operation.

3 Claims, 3 Drawing Figures

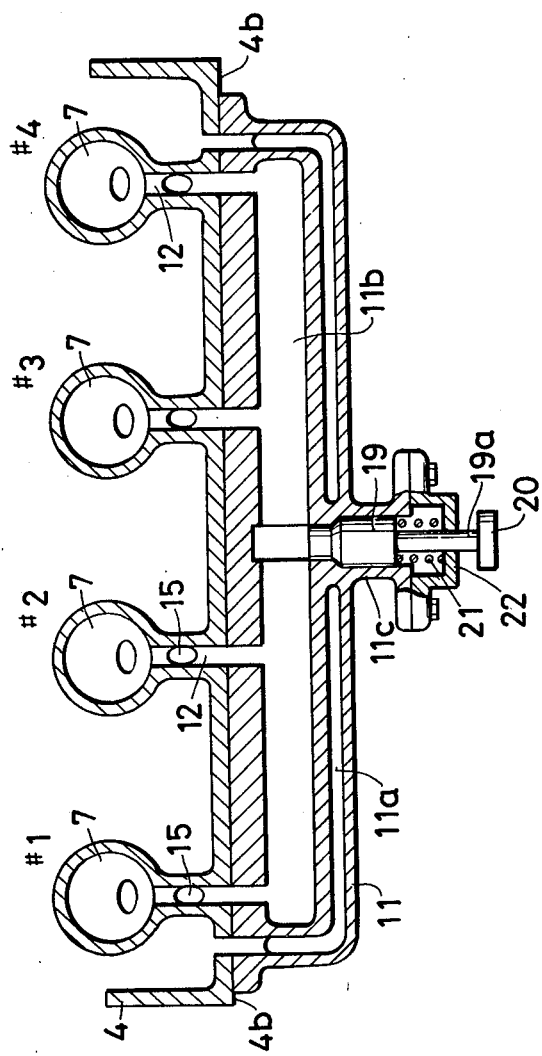
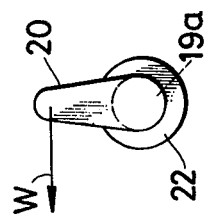

EXHAUST GAS PURIFYING DEVICE FOR INTERNAL COMBUSTION ENGINE WITH AUXILIARY COMBUSTION CHAMBER

BACKGROUND OF THE INVENTION

The present invention relates to an exhaust gas purifying device for a compression ignition type of internal combustion engine provided with auxiliary combustion chambers.

Most conventional exhaust gas purifying devices using an exhaust gas recirculating system in a compression ignition internal combustion engine are external recirculation type devices in which parts of the exhaust gas from the exhaust manifold or the exhaust conduit system are recirculated to the intake manifold or the intake conduit system. However, such conventional devices adversely affects the engine performance and smoke generation is substantial due to the small excess air ratio, and the exhaust gas recirculation conduit, intake manifold and the like become contaminated or at worst become blocked due to smoke deposits.

SUMMARY OF THE INVENTION

In view of the drawbacks accompanying the conventional devices, an object of the present invention is to control exhaust gas circulation by use of a control valve during the high load operation of an engine. In the present invention, each of the auxiliary combustion chambers communicates through an exhaust gas expansion manifold with the other auxiliary combustion chambers through cam operated valves. An exhaust gas recirculation control valve is further provided midway of the exhaust gas circulation manifold for the purpose of controlling the exhaust gas circulation during the high load operation of the engine.

BRIEF DESCRIPTION OF THE DRAWINGS

In the drawings:

FIG. 2 shows a plan sectional view of the exhaust gas circulation manifold system of the present invention, and FIG. 3 shows a rotatable lever for controlling the exhaust gas circulation control valve of the present invention.

DETAILED DESCRIPTION OF THE PREFERRED EMBODIMENT

Figure 1:
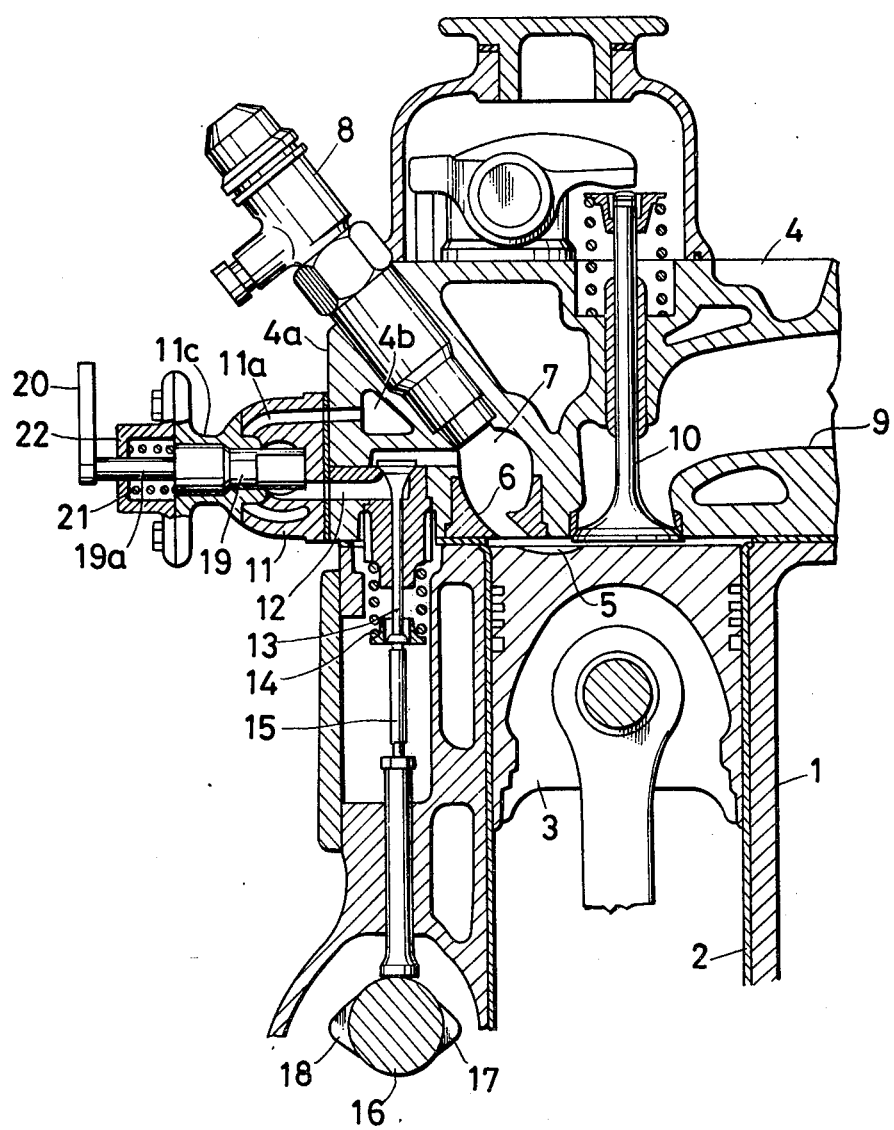
FIG. 1 shows a vertical sectional view of an engine cylinder illustrating one embodiment of the invention.

Referring to the drawings, FIG. 1 shows a cylinder body 1, for example, of four cylinders #1-4 of a compression ignition internal combustion engine having auxiliary combustion chambers. A piston 3 is reciprocably inserted into each cylinder 2. A cylinder head 4 is provided with an auxiliary combustion chamber 7 communicating through a passage 6 with a primary combustion chamber 5. Further, an injection nozzle 8 for injecting fuel from a supply source (not shown) into the auxiliary combustion chamber 7 is provided in the cylinder head.

An exhaust gas passage 9 communicates with the primary combustion chamber 5 through an exhaust valve 10 operable for opening in the range of the exhaust stroke of 50°-10° (crank angle) before the bottom dead center by a conventional cam mechanism.

An exhaust gas expansion manifold 11 is provided on wall 4a of the cylinder head 4. The exhaust gas expansion manifold 11 communicates through separate passages 12 with the auxiliary combustion chamber 7 of each of the cylinders #1-4 as shown in FIGS. 1 and 2. A cooling water passage or jacket 11a is formed in the external portion of the expansion manifold 11 and communicates with a cooling passage 4b of the cylinder head 4 so as to introduce cooling water thereinto, and thereby, the cooling effect of the exhaust gas passing through the expansion manifold 11 is greatly enhanced. It is possible to obtain the same effect by providing a fan or the like instead of forming the water cooling passage 11a in the periphery of the expansion manifold 11. A valve 13 is provided midway of passage 12. This valve is usually closed by the action of a return spring 14 and opened by the upward motion of a rod mechanism 15. A cam shaft 16 is rotated in response to the crank shaft (not shown). A plurality of cams (not shown) are provided for driving the conventional intake and exhaust valve mechanism, and at the same time, the rod mechanism 15 is moved upwardly by cams 17 and 18 near at the end of the expansion stroke in each of cylinders #1-4, that is, in the expansion stroke range of 90°-50° (crank angle) before the bottom dead center of each piston 3 thereof and in the latter half of the suction stroke, that is, in the suction stroke range of 60°-20° (crank angle) before the bottom dead center of each piston 3 thereof.

A butterfly-type control valve 19 is rotatably supported in a supporting portion 11c integral with the expansion manifold 11. The control valve 19 is disposed midway of the expansion manifold. The rotation of control valve 19 makes an internal passage 11b of the expansion manifold opened or closed. A rotating lever 20 is provided at the external end of a rotating shaft 19a. A spring 21 presses the control valve 19 toward the expansion manifold 11. The spring 21 is provided in a casing 22 mounted on the flanged portion of the supporting portion 11c so as to gas-tightly seal the valve portion.

The rotating lever 20 is connected to an engine operation control device, for example, a fuel control lever of a fuel injection pump (not shown) through a link mechanism or wires or the like. With this construction, the control valve 19 is moved in its closing direction, corresponding to the movement of the fuel control lever when the engine load reaches more than the load value of ¾.

The operation of the exhaust gas circulation device according to the present invention will be hereinafter described. In the preferred embodiment of the present invention, the engine is a 4-stoke compression ignition internal combustion engine and consists of four cylinders #1-4 as mentioned above. The engine ignition order is #1, #3, #4 and #2. In such a 4-stroke internal combustion engine, when the piston of cylinder #3, for example, nears the end of its expansion stroke, part of the residual exhaust gas in the associated auxiliary combustion chamber is expelled into the exhaust gas expansion manifold 11 through the passage 12 because the valve 13 is moved upwardly against the spring force of the return spring 14 via the raising movement of the cam 18 and the rod mechanism 15. The opening of the valve 13 occurs in the range of 90°-50° (crank angle) before the piston reaches bottom dead center. The exhaust gas which is introduced into the expansion manifold 11 is cooled by expansion of the gas, circulating water in the water jacket and the outside air to a suitable temperature and at the same time, when an other piston, for example the piston of the cylinder #2, is in the latter half of its suction stroke, the valve 13 is opened by the raising action of the cam 17 and the rod mechanism 15 so that the exhaust gas in the expansion manifold 11 is introduced into the auxiliary combustion chamber of the cylinder #2 through the passage 12. The opening of valve 13 in cylinder #2 occurs in the range of 60°-20° before the piston 3 reaches bottom dead center.

In the embodiment disclosed, if the engine ignition order is #1, #3, #4 and #2, the exhaust gas circulation is repeatedly carried out in the following order:
Exhaust gas from #1 cylinder to #4 cylinder,
Exhaust gas from #3 cylinder to #2 cylinder,
Exhaust gas from #4 cylinder to #1 cylinder, and
Exhaust gas from #2 cylinder to #3 cylinder.

Thus, the device according to this invention is so designed that exhaust gas circulation is effected from the auxiliary combustion chamber of one cylinder to that of another cylinder. Therefore, as compared with a conventional exhaust gas circulation system, as internal combustion engine employing the device of the invention achieves improved volumetric efficiency in each cylinder. Accordingly, the herein disclosed exhaust gas purifying device does not seriously or adversely influence the power output or smoke generation of the engine especially under high load operation. When the control valve 13 closes, the exhaust gas is sealed in the auxiliary combustion chamber 7 by the upward movement of the piston 3. Therefore, an improved exhaust gas circulation effect is obtained, and the exhaust gas circulation rate with respect to the volume of the auxiliary combustion chamber 7 can be made extremely high.

Further, when the engine loading reaches a high load range more than ¾, the rotating lever 20 rotates the control valve 19 in its closing direction, corresponding to the movement of the fuel control lever of the fuel injection pump, thereby controlling the exhaust gas circulation in the internal passage 11b of the expansion manifold 11. While in the preferred embodiment, a butterfly valve is employed, any type of valve is applicable if the valve can control the amount of the exhaust gas circulation. As mentioned above, the exhaust gas recirculation from the auxiliary combustion chamber is effectively accomplished, and the amount of the exhaust gas circulation can be controlled corresponding to the state of the engine load according to the present invention. Therefore, the present invention provides an exhaust gas purifying device without the usual deterioration of the engine performance.

What is claimed is:

1. In a multicylinder, four cycle compression ignition internal combustion engine of the type employing auxiliary combustion chambers in which fuel is injected in timed sequence, an exhaust gas recirculating device comprising:
   an exhaust gas expansion manifold communicating with each of said auxiliary combustion chambers through separate exhaust passages,
   a plurality of cam operated valves, one located in each of said separate exhaust passages for controlling the flow of exhaust gas between said auxiliary combustion chambers and said exhaust gas expansion manifold, said cam operated valves being driven by a common cam shaft to open in the expansion stroke and again in the suction stroke of their corresponding cylinders, and
   control valve means disposed within said exhaust gas expansion manifold for controlling the amount of exhaust gas circulation between said auxiliary combustion chambers under condition of high load operation.

2. An exhaust gas recirculating device as recited in claim 1 wherein said control valve means comprises a butterfly valve disposed midway of said exhaust gas expansion manifold.

3. An exhaust gas recirculating device as recited in claim 1 wherein said cam operated valves are opened in the range of 90°-50° (crank angle) before the bottom dead center of each piston of the power expansion stroke and in the range of 60°-20° (crank angle) before the bottom dead center of each piston of the suction stroke.

* * * * *